*INVENTOR.*
RALPH HODGES
JOHN H. KLASEY
BY
George R. Ericson

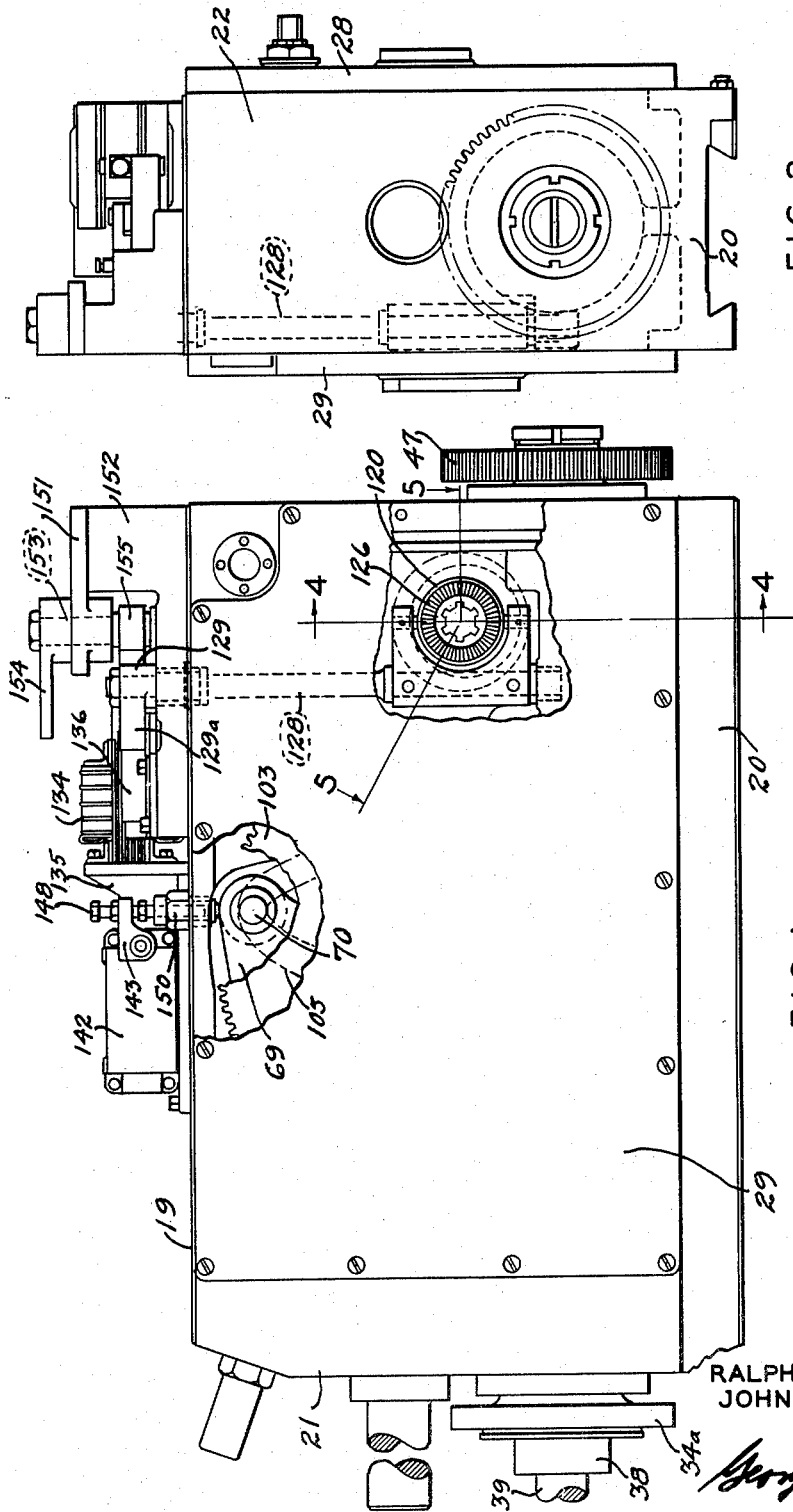

INVENTOR.
RALPH HODGES
JOHN H. KLASEY
BY
George R. Ericson

Patented Aug. 1, 1950

2,517,108

UNITED STATES PATENT OFFICE 2,517,108

ELECTRIC OPERATOR FOR OVERLOAD CLUTCHES

Ralph Hodges, Belleville, Ill., and John H. Klasey, St. Louis, Mo., assignors to Carter Carburetor Corporation, St. Louis, Mo., a corporation of Delaware Original application July 17, 1942, Serial No. 451,268. Divided and this application August 23, 1944, Serial No. 550,700

7 Claims. (Cl. 192—40)

The present invention relates to overload clutch devices, particularly adapted for use with machine tools. This application is a division of our copending application Serial No. 451,268 filed July 17, 1942, now Patent No. 2,395,121.

Automatic machine tools, such as that illustrated in the above mentioned application, require some sort of device which will protect the machine and tools from damage in case the operation is impeded or stopped by an overload. In overload clutches as commonly used, the clutch part becomes disengaged at such time, but rotation thereof continues resulting in annoying chattering and possible damage to the clutch teeth.

It is an object of the present invention to provide a safety device of the overload clutch type in which the application of power to the working parts of the machine is dependent upon operating contact of the clutch part and, in which, separation of the clutch parts, as by an overload, immediately stops the application of power to the machine.

This object, and other more detailed objects hereafter appearing, are attained by the device illustrated in the accompanying drawings in which Fig. 1 is a side view illustrating a drilling head unit having the novel overload clutch applied thereto, parts being broken away for clearer illustration.

Fig. 2 is an end view of the unit.

Figure 4:
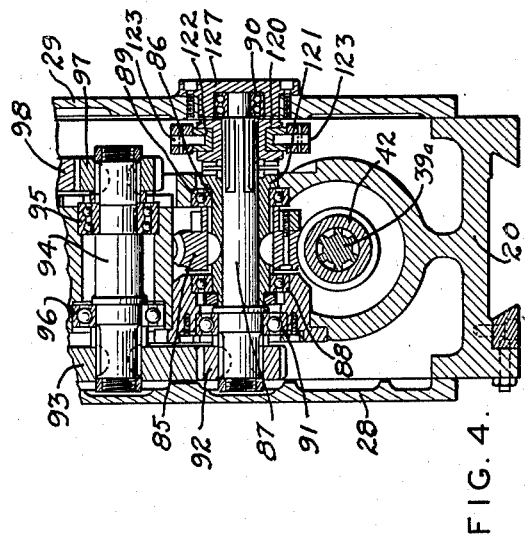
Fig. 4 is a detail vertical section taken approximately on the section line 4—4 of Fig. 1.
Figure 3:
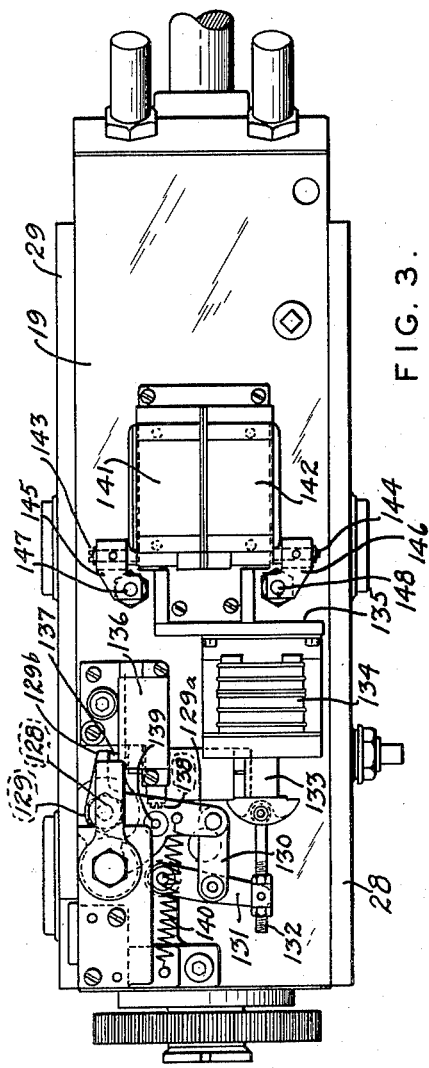
Fig. 3 is a top view of the unit.
Figure 5:
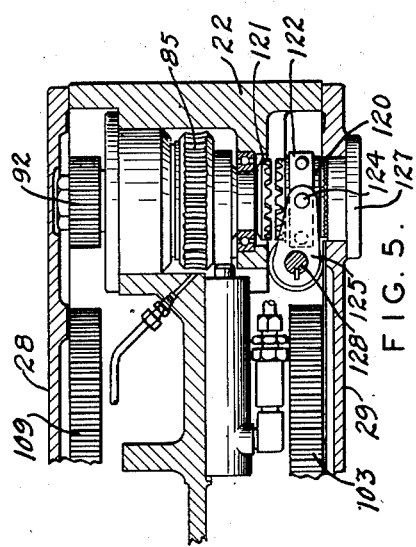
Fig. 5 is a section taken substantially on the broken section line 5—5 of Fig. 1.

The operating mechanism of the unit is enclosed in a casing including side plates 28 and 29, end plates 21 and 22, bottom plate 20, and top plate 19. Longitudinally slidable in the lower part of the casing are telescoping sleeve and spindle members, the left hand extremities thereof being shown at 34a and 39. Spindle 39 is supported in a quill of which the extremity is shown at 38. The right hand portion of the spindle is fluted, as shown at 39a in Fig. 4, and received within and keyed to rotate with a hollow shaft 42, the fluting of the spindle permitting relative longitudinal movement thereof within hollow shaft 42, the latter being threaded to form a worm, which meshes with a worm gear 85. Gear 85 is keyed to a sleeve 121 supported in bearings 88 and 89 and received on a transverse shaft 87, supported in bearings 90 and 91. Bearing 90 is carried in a plug 127 bolted in right hand side plate 29 (Fig. 4). A pinion 92 is keyed to the left hand end of shaft 87 and transmits force to reciprocate the sleeve member and spindle longitudinally, according to predetermined operating cycles, through gear trains including gears 93, 97, 98, large gears 103 and 109 having cam grooves on their inner surfaces, as at 105, and cam follower levers 59 and 69, the latter having a roller 70 operating in groove 105 of the gear 103. Gears 93 and 97 are mounted on a cross shaft 94 supported in bearings 95 and 96. For more complete disclosure of the operating mechanism of the tool unit, reference is made to the above mentioned copending application.

The advancing and retracting mechanisms are driven from a motor shaft (not shown) operatively connected to gear 47 secured to the outer end of the hollow shaft 42 and through an overload clutch arrangement which constitutes the present invention. The end of shaft 87 opposite pinion 92 is fluted and receives thereon a toothed clutching plate 120, for rotation therewith but capable of longitudinal movement therealong. The adjacent end of sleeve 86 is enlarged, as at 121, and is provided with tapered clutching teeth to cooperate with opposing teeth on plate 120. A collar 122 is loosely received on clutch plate 120 and is apertured at 123 for receiving pins 124 on clutch yoke 125. The outer face of clutch plate 120 is roughed, as at 126 (Fig. 1) for braking engagement with the roughened inner face of a fixed plug 127 seated in side plate 29.

Yoke 125 is secured to a vertical shaft 128 at the upper end of which is rigidly fastened a bell crank 129. One arm 129a of this bell crank is connected through multiplying leverage 130 and 131 to a stem 132 on the core 133 of a solenoid 134 mounted on a bracket 135 on top plate 19. When solenoid 134 is energized, clutch parts 120 and 121 are caused to engage so that power is transmitted from gear 85 and worm 42 to the tool advancing and retracting mechanisms.

Also mounted on the top plate of the framing is a switch housing 136 from which projects the clutch safety limit switch operator 137 in position to be actuated by the short arm 129b of bell crank 129, and the clutch overload cut-off switch operator 138 in position to be actuated by a depending pin 139 on longer arm 129a of bell crank 129. Bell crank 129 is constantly urged clockwise by a coiled tension spring 140 so that when solenoid 134 is de-energized, switch operator pin 137 is moved into the switch housing to close the safety switch, and switch operator pin 138 is projected outwardly of the housing for opening the cut-out switch.

Additional switch devices in housings 141 and 142 have, respectively, switch operating shafts 143 and 144 with cranks 145 and 146 thereon carrying adjusting tappets 147 and 148 which extend below guides, as at 150 in top plate 19 of the framing, in position to be engaged and urged upwardly by the upper extremities of the cam follower levers, one being shown at 69 in Fig. 1, when the tool carrying members operated thereby are in their retracted positions.

A bracket 151 is bolted to a block 152 projecting above the framing top plate and loosely receives a vertical shaft 153. A clutch release handle 154 is secured to the upper extremity of this shaft and a cam 155 is rigid with the shaft below bracket 151 and aligned with arm 129b of bell crank 129. Manual rotation of handle 154 and cam 155 causes a high point on the cam to engage and rotate the bell crank shaft 128, and clutch yoke 125 just sufficiently to move clutch plate 120 to a neutral position between brake plug 127 and clutch sleeve face 121. When the overload clutch is engaged and the driving motor energized, the sleeve member, of which one extremity is indicated at 34a and the quill and spindle member 38, 39, are jointly advanced forward, and retracted to the rest positions thereof in operative cycles as determined by the feeding mechanism.

Figure 6:
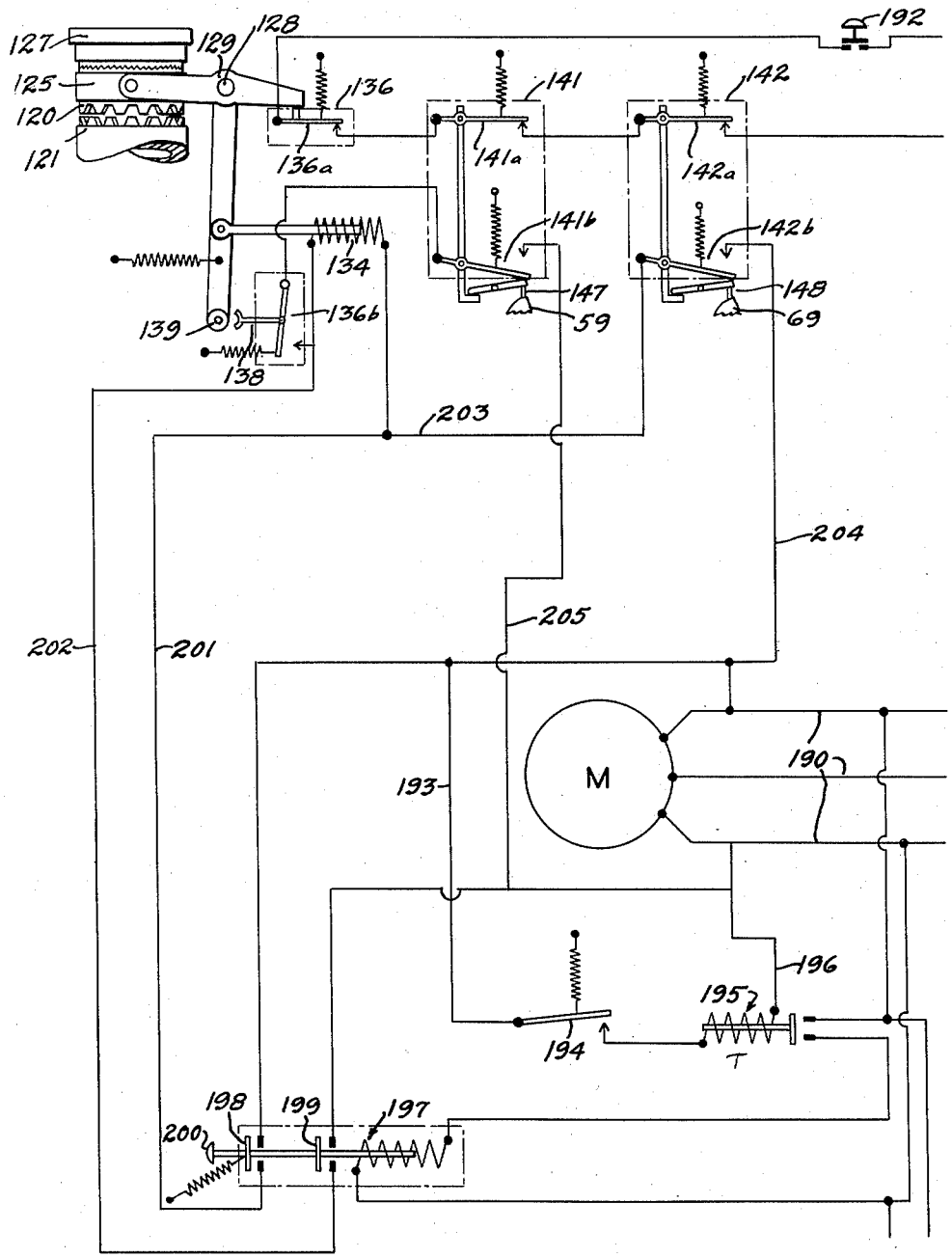
Fig. 6 is a wiring diagram for the clutch and tool unit.

The diagram in Fig. 6 illustrates the wiring arrangement of the machine head unit when used in a multi-station drilling machine having an indexing work support table. Corresponding parts appearing in the previous figures are given similar designating numerals for reference. The power lines for the unit motor are indicated at 190, three wires being provided for three phase current. The power circuit for the indexing table is shown at 191 and includes a manual indexing button 192 to be pushed by the operator to initiate indexing movement of the table and the correlated cycles of the machine head units. Circuit 191 breaks through normally open clutch safety switch 136a in housing 136 and the normally open contacts 141a of spindle return switch 141 and 142a of sleeve return switch 142, the latter being two contact switches.

For operating the overload clutch to produce the advancing and retracting cycles of the spindle and sleeve members, a lead 193 from one of the power lines breaks through a switch 194 which is closed in response to locking of the indexing table in a working position, and the coil of a time delay relay 195 and thence by wire 196 to the other power line. Relay 195 is of such character as to automatically open after being closed a short time. This relay controls the coil of a magnetic switch 197, one such magnetic switch similarly controlled being provided for each machining head unit. The movable contacts 198 and 199 of switch 197 may be manually operated by means of a button 200 for initiating a working cycle of one unit only. Solenoid 134, when energized, rotates bell crank 129, shaft 128, and yoke 125 counterclockwise to engage clutch elements 120 and 121 and is initially energized by a circuit including wires 201 and 202 each breaking through one of the contacts 198 and 199 of magnetic switch 197. Engagement of the clutch causes rotation of the train of gears which starts the longitudinal cycles of the spindle and sleeve members.

Counterclockwise rotation of bell crank 129 for engaging clutch parts 120, 121 also permits opening of switch 136a in the indexing table circuit due to movement of the short arm of the bell crank out of switch closing position and, at the same time, closes switch 136b by engagement of actuating plunger 138 by pin 139 carried by the long arm of the bell crank.

As the feed mechanism starts to operate, switch actuator pins 147 and 148 are released by being disengaged from cam follower levers 59 and 69, permitting reversing of switch contacts 141a and 142a, opening the indexing table circuit 191 and closing contacts 141b and 142b. A second energizing circuit for clutch holding solenoid 134 is provided by a lead 203 breaking through switch 142b, a lead 204 to the power line, and a lead 205 breaking through clutch overload switch 136b and spindle return switch 141b to the other power line.

Thus, if the indexing table is in a working position and both the sleeve and quill are in their rest positions, switches 194, 136a, 141a, and 142a will be closed and the operator can initiate the operating cycle by merely pressing indexing button 192. Time relay 195 and unit control magnetic switch 197 are then closed so as to cause engagement of the overload clutch and start longitudinal reciprocation of the sleeve and spindle members. Initial operation of the feeding mechanism is accompanied by closing of switches 136b, 141b and 142b and completion of the second circuit 203, 205 for energizing the clutch magnet 134. After a short time interval, the relay 195 automatically opens. Thereafter, in case an overload should cause separation of clutch elements 120 and 121, switch 136b, which is a micro-switch, will be immediately opened so as to deenergize clutch holding solenoid 134 and stop the reciprocation of the spindle and sleeve members. This eliminates the chattering of the clutch members, which would otherwise occur if holding force were continuously applied to the clutch through solenoid 134 until the operator has stopped the machinery. Damage to the clutch and other parts is thus avoided as is the very annoying chattering noise.

The invention may be modified in various respects as will occur to those skilled in the art and the exclusive use of all such modifications as come within the scope of the appended claims is contemplated.

We claim:

1. In combination with driving and driven members, an overload clutch therebetween, a magnetic device to engage said clutch, an electrical circuit for said magnetic device including an element which automatically opens said circuit shortly after it is closed to engage said clutch, and an additional circuit for said device to cause the same to apply yielding force to hold said clutch in engagement dependent upon maintenance of said clutch in engagement.

2. In combination with driving and driven members, an overload clutch therebetween, means to engage said clutch and automatically rendered inoperative to hold said clutch in engagement after a time interval, magnetic means to yieldingly hold said clutch in engagement, and a power circuit for said magnetic means including a micro-switch which is closed automatically and only when said clutch is engaged.

3. In combination with driving and driven members, an overload clutch therebetween, magnetic means to engage said clutch and hold the same in engagement including a first power circuit with a switch which is automatically opened shortly after closing of said circuit to engage said clutch, a second power circuit with a microswitch which is closed only when said clutch is in engagement, means to energize said first power circuit dependent upon the positioning of said driven member in a predetermined rest position, and means for energizing said second circuit dependent upon maintenance of said clutch in engagement.

4. In combination with a driving member and a driven member subject to cyclical movement to and from a rest position, an overload clutch between said driving and driven members, means to engage said clutch dependent upon said cyclically driven member being in its rest position, said engaging means being constructed and arranged to become ineffective to hold said clutch in engagement after a time interval, and additional means rendered operative upon engagement of said cltuch to hold said clutch in engagement.

5. In combination with a driving member and a cyclically moving driven member, an overload clutch therebetween, means to initially engage said clutch dependent upon said driven member being in a predetermined rest position, and means to apply yielding force to hold said clutch engaged dependent both upon said driven member being away from said rest position and the maintenance of said clutch engaged.

6. In combination with driving and driven members, an overload clutch therebetween, mechanical means operative to engage said clutch, a magnetic device for operating said mechanical means, an electric circuit for said magnetic device including an element which automatically opens said circuit shortly after it is closed to operate said mechanical means to engage said clutch, and an additional electric circuit for said magnetic device for operating said mechanical means to apply yielding force to hold said clutch in engagement dependent upon maintenance of said clutch in engagement.

7. In combination with a driving member and a cyclically moving driven member, an overload clutch therebetween, mechanism including a bell crank operative to engage said clutch, means for operating said bell crank to initially engage said clutch dependent upon said driven member being in a predetermined rest position, and means for operating said bell crank to apply yielding force to hold said clutch in engagement dependent both upon said driven member being away from said rest position and also upon the maintenance of said clutch in engagement.

RALPH HODGES.
JOHN H. KLASEY.

REFERENCES CITED

The following references are of record in the file of this patent:

UNITED STATES PATENTS

| Number | Name | Date |
|---|---|---|
| 1,491,426 | Schunemann | Apr. 22, 1924 |
| 1,678,634 | Chandler | July 31, 1928 |
| 1,850,299 | Watson | Mar. 22, 1932 |
| 2,068,260 | Biggert, Jr. | Jan. 19, 1937 |